(12) United States Patent
Sugita et al.

(10) Patent No.: US 10,890,495 B2
(45) Date of Patent: Jan. 12, 2021

(54) PRESSURE-SENSITIVE SENSOR INCLUDING A HOLLOW TUBULAR MEMBER OF AN ELASTIC INSULATION

(71) Applicant: Hitachi Metals, Ltd., Tokyo (JP)

(72) Inventors: Keisuke Sugita, Tokyo (JP); Masahiro Abe, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 16/167,753

(22) Filed: Oct. 23, 2018

(65) Prior Publication Data
US 2019/0178729 A1 Jun. 13, 2019

(30) Foreign Application Priority Data
Dec. 8, 2017 (JP) ................................. 2017-235632

(51) Int. Cl.
| | | |
|---|---|---|
| G01L 1/02 | (2006.01) | |
| H01H 1/14 | (2006.01) | |
| G01L 1/00 | (2006.01) | |
| G01L 1/20 | (2006.01) | |
| H01H 11/00 | (2006.01) | |
| H01B 1/24 | (2006.01) | |
| H01H 9/02 | (2006.01) | |

(52) U.S. Cl.
CPC ................ *G01L 1/005* (2013.01); *G01L 1/20* (2013.01); *H01B 1/24* (2013.01); *H01H 1/14* (2013.01); *H01H 9/02* (2013.01); *H01H 11/00* (2013.01); *H01H 2203/008* (2013.01)

(58) Field of Classification Search
CPC .. H01H 3/142; H01H 2003/143; H01B 7/104; H01B 7/106; H01B 7/10
See application file for complete search history.

(56) References Cited

U.S. PATENT DOCUMENTS

| | | | | | |
|---|---|---|---|---|---|
| 2,783,325 | A | * | 2/1957 | Luckey | ..................... H01B 7/10 200/83 R |
| 3,008,187 | A | * | 11/1961 | Slade | ..................... B29C 48/30 264/119 |
| 4,435,968 | A | * | 3/1984 | Roderburg | ............ B21C 37/207 72/77 |
| 4,683,349 | A | * | 7/1987 | Takebe | ..................... H01B 7/06 174/113 C |
| 5,555,618 | A | * | 9/1996 | Winkler | ................. A61N 1/056 29/825 |
| 5,609,624 | A | * | 3/1997 | Kalis | ......................... A61F 2/06 623/1.32 |

(Continued)

FOREIGN PATENT DOCUMENTS

JP H10-281906 A 10/1998

*Primary Examiner* — Tran M. Tran
(74) *Attorney, Agent, or Firm* — Scully, Scott, Murphy & Presser, P.C.

(57) ABSTRACT

A pressure-sensitive sensor includes a hollow tubular member including an elastic insulation, plural electrode wires spaced from one another and held on an inner circumferential surface of the tubular member, and helical ribs formed on at least one of inner and outer circumferential surfaces of the tubular member along a longitudinal direction thereof. The electrode wires are helically arranged along the longitudinal direction. A helical direction of the helical ribs of the tubular member is a same as a helical direction of the helically-arranged electrode wires.

10 Claims, 8 Drawing Sheets

(56) References Cited

U.S. PATENT DOCUMENTS

| | | | | |
|---|---|---|---|---|
| 5,653,745 A * | 8/1997 | Trescony | A61F 2/06 | 623/1.29 |
| 5,728,983 A * | 3/1998 | Ishihara | B60J 10/00 | 200/61.43 |
| 6,078,014 A * | 6/2000 | Kashiwazaki | H01B 7/104 | 200/61.43 |
| 6,107,580 A * | 8/2000 | Hoshikawa | H01H 3/142 | 200/61.43 |
| 6,316,846 B1 * | 11/2001 | Kashiwazaki | H01B 7/104 | 307/119 |
| 6,339,305 B1 * | 1/2002 | Ishihara | E05F 15/44 | 318/282 |
| 6,429,375 B1 * | 8/2002 | Beckhausen | H01B 7/104 | 174/43 |
| 6,546,625 B1 * | 4/2003 | Le | H01B 7/0009 | 29/854 |
| 6,563,107 B2 * | 5/2003 | Danisch | G01B 11/18 | 250/227.14 |
| 6,609,432 B2 * | 8/2003 | Kume | H01H 3/142 | 73/862.381 |
| 6,912,912 B2 * | 7/2005 | Reichinger | G01L 1/243 | 356/32 |
| 6,955,079 B2 * | 10/2005 | Ishihara | E05F 15/44 | 318/445 |
| 7,055,885 B2 * | 6/2006 | Ishihara | E05F 15/44 | 200/61.43 |
| 7,150,179 B2 * | 12/2006 | Takafuji | B60R 21/0136 | 73/12.09 |
| 7,534,957 B2 * | 5/2009 | Yamaura | H03K 17/962 | 174/36 |
| 7,554,045 B2 * | 6/2009 | Sandbach | D02G 3/441 | 200/61.43 |
| 8,115,125 B2 * | 2/2012 | Yasuda | H01H 3/142 | 200/61.43 |
| 8,159,231 B2 * | 4/2012 | Sakamaki | E05F 15/46 | 324/663 |
| 8,191,427 B2 * | 6/2012 | Hattori | E05F 15/44 | 324/601 |
| 8,336,255 B2 * | 12/2012 | Shimizu | E05F 15/70 | 49/27 |
| 8,395,474 B2 * | 3/2013 | Tanba | H01C 10/10 | 338/114 |
| 8,752,273 B2 * | 6/2014 | Miyamoto | E05F 15/443 | 29/593 |
| 8,795,202 B2 * | 8/2014 | Northrop | A61M 25/09033 | 600/585 |
| 9,059,712 B2 * | 6/2015 | Ishihara | H03K 17/96 | |
| 9,202,644 B2 * | 12/2015 | Aoyama | H01H 3/60 | |
| 9,217,679 B2 * | 12/2015 | Ishihara | G01L 1/04 | |
| 9,227,036 B2 * | 1/2016 | Anderson | A61B 18/1492 | |
| 9,318,238 B2 * | 4/2016 | Yamaguchi | H01B 11/1856 | |
| 9,449,741 B2 * | 9/2016 | Abe | H01B 11/1834 | |
| 9,486,603 B2 * | 11/2016 | Dye | A61M 25/0017 | |
| 9,570,247 B2 * | 2/2017 | Clemente | F16P 3/12 | |
| 9,737,421 B2 * | 8/2017 | Houston | A61F 2/06 | |
| 9,878,125 B2 * | 1/2018 | Dye | A61M 25/0017 | |
| 9,956,069 B2 * | 5/2018 | Noesner | B29C 66/532 | |
| 9,984,832 B2 * | 5/2018 | Takaba | H01H 3/142 | |
| 10,451,496 B2 * | 10/2019 | Sugita | G01L 1/2287 | |
| 2002/0078758 A1 * | 6/2002 | Suzuki | E05F 15/44 | 73/753 |
| 2002/0088283 A1 * | 7/2002 | Kume | H01H 3/142 | 73/862.68 |
| 2002/0104373 A1 * | 8/2002 | Ishihara | E05F 15/44 | 340/556 |
| 2003/0106377 A1 * | 6/2003 | Ishihara | E05F 15/44 | 73/756 |
| 2007/0167684 A1 * | 7/2007 | Toyama | A61B 1/0055 | 600/128 |
| 2009/0229851 A1 * | 9/2009 | Thuot | H01B 7/0275 | 174/107 |
| 2009/0233052 A1 * | 9/2009 | Thuot | H01B 7/0233 | 428/159 |
| 2010/0006407 A1 * | 1/2010 | Masuko | H01H 3/142 | 200/61.44 |
| 2015/0047874 A1 * | 2/2015 | Thuot | H01B 7/0233 | 174/110 SR |
| 2018/0364387 A1 * | 12/2018 | Hattori | G01V 3/02 | |
| 2019/0228881 A1 * | 7/2019 | Furuta | B23H 11/006 | |
| 2020/0015885 A1 * | 1/2020 | Greifeneder | A61M 25/0662 | |

* cited by examiner

PRESSURE-SENSITIVE SENSOR INCLUDING A HOLLOW TUBULAR MEMBER OF AN ELASTIC INSULATION

CROSS-REFERENCE TO RELATED APPLICATIONS

The present application is based on Japanese patent application No. 2017-235632 filed on Dec. 8, 2017, the entire contents of which are incorporated herein by reference.

BACKGROUND OF THE INVENTION

1. Field of the Invention

The invention relates to a pressure-sensitive sensor and a method for manufacturing the pressure-sensitive sensor.

2. Description of the Related Art

Pressure-sensitive sensors which have electrode wires coming into contact with each other when subjected to an external pressure and thereby act as a switch are used as anti-pinch sensors for automobile sliding doors etc. (see e.g., JP H10/281906 A).

The pressure-sensitive sensor described in JP H10/281906 A is provided with a tubular elastic insulation having a hollow portion and plural electrode wires which are spaced from each other and are helically arranged on the inner circumferential surface of the hollow portion of the elastic insulation. In this hollow helical structure, the electrode wires come into contact with each other regardless of the direction of deformation, allowing for detection in all directions. To manufacture this pressure-sensitive sensor, the plural electrode wires are placed along an outer circumferential surface of a spacer having the same shape as the hollow portion, the elastic insulation is molded by extruding a rubber material around the spacer and the plural electrode wires, and the spacer is then pulled out.

SUMMARY OF THE INVENTION

The pressure-sensitive sensor described in JP H10/281906 A needs the spacer in the manufacture thereof. Thus, it is necessary to perform a step of making the spacer, a step of placing the electrode wires along the spacer and a step of pulling out the spacer and there is a problem that the increased number of steps pushes the manufacturing cost up. In addition, when pulling out the spacer, high frictional resistance between the electrode wires and the spacer may cause the spacer to break during pulling out or the electrode wires to be damaged, e.g., scraped. Therefore, it is necessary to pull out the spacer after cutting into short lengths. This causes a problem that the spacer cannot be reused, causing an increase in the material cost, or a problem that a length of the finished pressure-sensitive sensor is limited.

It is an object of the invention to provide a pressure-sensitive sensor that allows mutual contact of the electrode wires even when pressured in any direction, free length setting of the finished product and low-cost manufacturing thereof, as well as a method for manufacturing the pressure-sensitive sensor.

According to an embodiment of the invention, provided are pressure-sensitive sensor and a method for manufacturing the pressure-sensitive sensor defined by [1] to [4] below.

[1] A pressure-sensitive sensor, comprising:
a hollow tubular member comprising an elastic insulation;
a plurality of electrode wires spaced from one another and held on an inner circumferential surface of the tubular member; and
helical ribs formed on at least one of inner and outer circumferential surfaces of the tubular member along a longitudinal direction thereof,
wherein the electrode wires are helically arranged along the longitudinal direction, and
wherein a helical direction of the helical ribs of the tubular member is a same as a helical direction of the helically-arranged electrode wires.

[2] A method for manufacturing a pressure-sensitive sensor that comprises a hollow tubular member comprising an elastic insulation, and a plurality of electrode wires spaced from one another and held on an inner circumferential surface of the tubular member, the method comprising:
forming the tubular member by extruding the tubular elastic insulation such that the plurality of electrode wires are held on the inner circumferential surface while feeding the plurality of electrode wires at a distance from one another; and
extruding the tubular elastic insulation while rotating the tubular elastic insulation in a circumferential direction of the tubular member such that the plurality of electrode wires are helically arranged along a longitudinal direction of the tubular member.

[3] The method according to [2], wherein the tubular elastic insulation is made to flow along grooves engraved on an inner circumferential surface of a die so as to be inclined with respect to an extruding direction and is thereby extruded while being rotated in the circumferential direction.

[4] The method according to [2] or [3], wherein the tubular elastic insulation is made to flow along grooves engraved on an outer circumferential surface of a mandrel so as to be inclined with respect to an extruding direction and is thereby extruded while being rotated in the circumferential direction.

Effects of the Invention

According to an embodiment of the invention, a pressure-sensitive sensor can be provided that allows mutual contact of the electrode wires even when pressured in any direction, free length setting of the finished product and low-cost manufacturing thereof, as well as a method for manufacturing the pressure-sensitive sensor.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

A pressure-sensitive sensor of the invention can be used on sliding door, back door and power window of automobile, elevator door, shutter, automatic door, vehicle door and home door, etc., for anti-pinch application.

First Embodiment

The first embodiment of the invention will be described below in reference to FIGS. 1 to 5. Note that, the embodiments described below are only shown as preferred examples for implementing the invention. Although some part of the embodiments specifically illustrates various technically preferable matters, the technical scope of the invention is not limited to such specific aspects.

Figure 1:
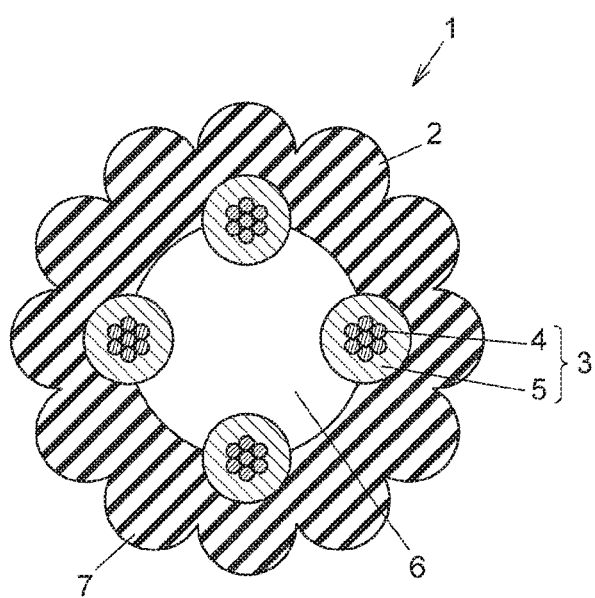
FIG. 1 is a cross sectional view showing a pressure-sensitive sensor in the first embodiment of the present invention.

FIG. 1 is a cross sectional view showing a pressure-sensitive sensor in the first embodiment of the invention. A pressure-sensitive sensor 1 is provided with a hollow tubular member 2 formed of an elastic insulation, and plural (four in the first embodiment) electrode wires 3 spaced from one another and held on an inner circumferential surface of the tubular member 2. Helical ribs 7 are formed on an outer circumferential surface of the tubular member 2 along a longitudinal direction. The plural electrode wires 3 are helically arranged along the longitudinal direction. A helical direction of the helical ribs 7 of the tubular member 2 is the same as a helical direction of the helically-arranged electrode wires 3.

Each electrode wire 3 is formed by covering a metal wire 4 with an elastic conductor 5, and the electrode wires 3 are separated by a space 6. An outer circumferential shape of the tubular member 2 in the cross section varies depending on the shape of grooves 9 of a die 8 (described later) shown in FIGS. 4 and 5.

Figure 2:
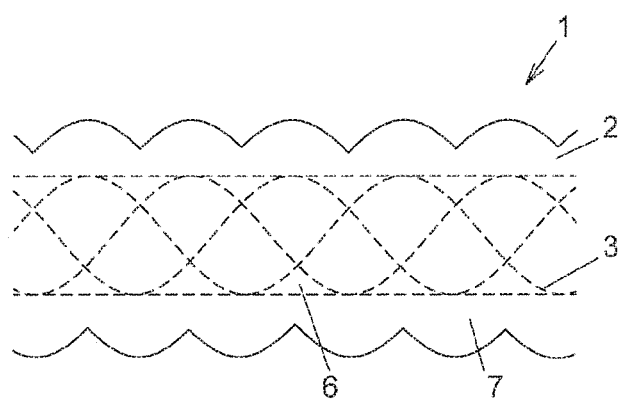
FIG. 2 is a schematic transparent side view showing the pressure-sensitive sensor in the first embodiment of the invention.

FIG. 2 is a schematic transparent side view showing the pressure-sensitive sensor in the first embodiment of the invention. In the pressure-sensitive sensor 1, the tubular member 2 is formed of an elastic insulation, and the plural electrode wires 3 held at a distance from one another inside the tubular member 2 are helically arranged along the longitudinal direction of the tubular member 2.

When the tubular member 2 is subjected to an external pressure, the pressure-sensitive sensor 1 elastically deforms and at least any two of the plural electrode wires 3 come into contact with each other (short-circuited).

The electrode wires 3 are helically arranged at a distance from one another inside the tubular member 2. Each electrode wire 3 is composed of the metal wire 4 and the elastic conductor 5 covering the metal wire 4.

The metal wire 4 can be, e.g., a solid wire formed of a highly conductive metal such as copper or a twisted wire formed by twisting plural (seven in this example) strands. As an alternative metal wire, it is possible to use a tinsel copper wire formed by wrapping copper foil around a string formed of polyester, etc. Surfaces of such metal wires may be plated with tin, nickel, silver or zinc, etc., to have higher heat resistance.

Meanwhile, to form elastic conductor 5, it is possible to suitably use, e.g., a rubber-based composition obtained by cross-linking an ethylene-propylene-diene copolymer mixed with a conductive filler such as carbon black, or an olefin-based or styrene-based thermoplastic elastomer composition not requiring a cross-linking process.

The helical ribs 7 which are formed on the outer circumferential surface of the tubular member 2 are effective to reduce a frictional force (resistance between contact surfaces) at the time of, e.g., inserting the pressure-sensitive sensor 1 into a tube. Particularly insertion with rotation in a helical direction can further reduce a frictional force.

The pressure-sensitive sensor 1 can be obtained by the following manufacturing method.

Figure 3:
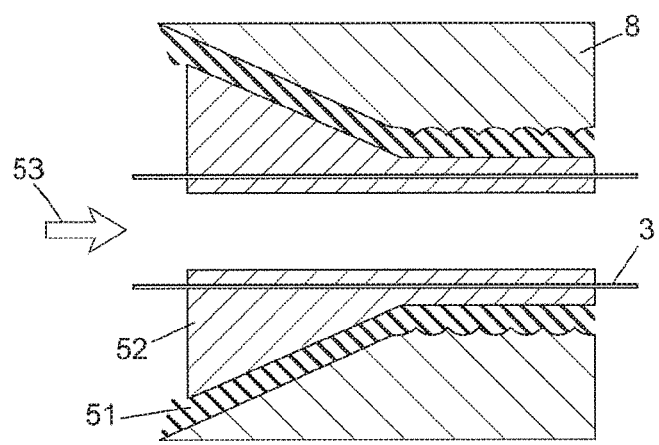
FIG. 3 is a cross sectional view showing an extruder used for manufacturing the pressure-sensitive sensor in the first embodiment of the invention.

Firstly, the electrode wires 3 are made by covering the metal wires 4 with the elastic conductors 5 using an extruder. Next, as shown in FIG. 3, plural (four in the present embodiment) electrode wires 3 are arranged so that the respective centers are located on the vertices of a square, and then, the electrode wires 3 are fed through a crosshead of the extruder while extruding a tubular elastic insulation 51 on the outer peripheral side (from the die 8), and the electrode wires 3 are thereby fused to and held on the inner circumferential surface of the elastic insulation (the tubular member 2). At this time, by extruding the tubular elastic insulation 51 while rotating in the circumferential direction, the electrode wires 3 are helically arranged. To arrange the electrode wires 3 on the vertices of a square, there is a method in which the electrode wires 3 are fed through four holes formed on a mandrel 52 of the extruder. To prevent the tubular member 2, the electrode wires 3 and the space 6 from losing the shape and alignment, a compressed gas 53 can be injected from the inside of the tubular member 2. To inject the compressed gas, there is a method in which one or plural holes are formed at, e.g., the center of the mandrel 52 and the compressed gas 53 is supplied from the inner side of the mandrel 52 toward an outlet. Suitable compressed gas 53 is the air or an inert gas such as nitrogen.

Figure 4:
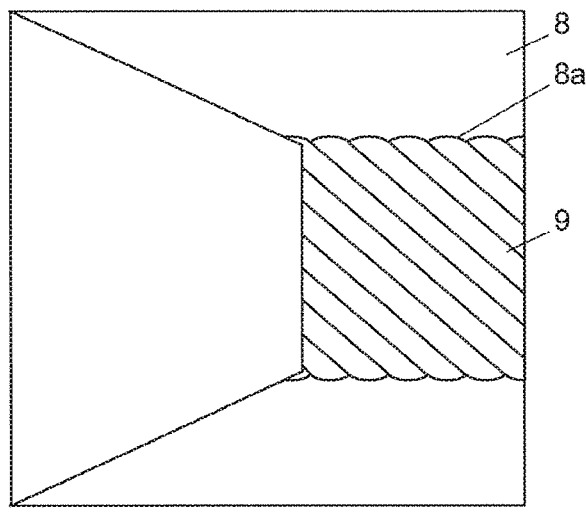
FIG. 4 is a cross sectional view showing a die used for manufacturing the pressure-sensitive sensor in the first embodiment of the invention.

FIG. 4 is a cross sectional view showing a die used for manufacturing the pressure-sensitive sensor in the first embodiment of the invention. The die 8 shown in FIG. 3 can be used as a means for extruding the elastic insulation 51 while rotating in the circumferential direction. The die 8 has a structure in which plural grooves 9 inclined with respect to an extruding direction (an axial direction of the tubular member 2) are engraved at equal intervals over the entire inner circumferential surface of a die end portion 8a.

Since the grooves 9 are inclined with respect to the extruding direction, an extrusion material (the elastic insulation 51) flowing along the grooves 9 is discharged obliquely with respect to the extruding direction. By engraving the grooves 9 at equal intervals over the entire inner circumferential surface of the die end portion 8a, it is possible to extrude a tubular extrudate (the tubular member 2) while rotating in the circumferential direction. As a result, the helical ribs 7 corresponding to the grooves 9 of the die end portion 8a are formed on the outer circumferential surface of the tubular extrudate. The helical direction of the helical ribs 7 formed on the outer circumferential surface of the tubular member 2 is the same as the helical direction of the helically-arranged electrode wires 3. In addition, the helical pitch of the helical ribs 7 is the same as the helical pitch of the electrode wires 3.

Figure 5:
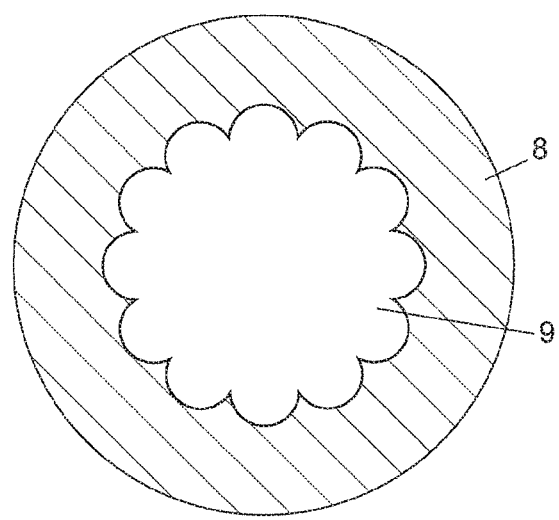
FIG. 5 is a front view showing the die used for manufacturing the pressure-sensitive sensor in the first embodiment of the invention when viewed in an axial direction.

FIG. 5 is a front view showing the die 8 used for manufacturing the pressure-sensitive sensor in the first embodiment of the invention when viewed in an axial direction (viewed from the side where the extrusion material is discharged). The cross-sectional shape of the groove 9 can be a semi-circular shape or a rectangular shape, but a semi-circular shape is suitable in view of easy flow of the extrusion material. For the groove 9, the number, depth and angle with respect to the extrusion direction can be freely selected. By changing the angle of the groove 9, the flow angle of the extrusion material (an angle formed between the axial direction of the tubular member 2 and a discharge direction of the extrusion material) can be changed and it is thereby possible to change a rotational speed of the extrusion material in the circumferential direction.

The pressure-sensitive sensor 1 can be manufactured without length limitation and is, e.g., 1 meter to several tens meters depending on the intended use. The outer diameter of the tubular member 2 is, e.g., 4 mm. To form the tubular member 2, it is possible to use a material which has a small compression set and is excellent in flexibility, cold resistance, water resistance, chemical resistance and weather resistance, etc., and it is possible to suitably use, e.g., a rubber-based composition obtained by cross-linking an ethylene-propylene-diene copolymer, or an olefin-based or styrene-based thermoplastic elastomer composition not requiring a cross-linking process.

Other Embodiments

Next, other embodiments of the invention will be described in reference to FIGS. 6 to 8.

Figure 6:
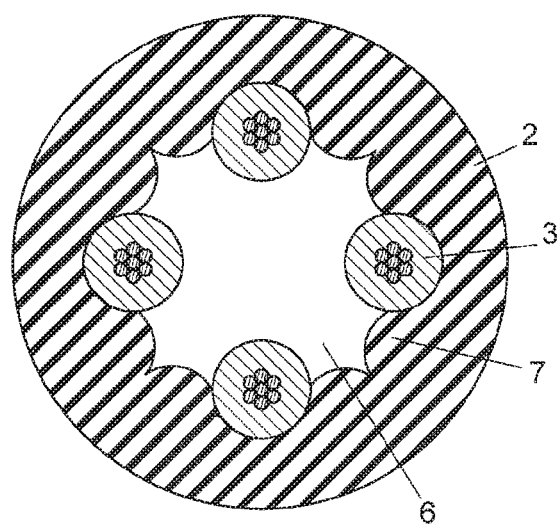
FIG. 6 is a cross sectional view showing a pressure-sensitive sensor in the second embodiment of the invention.
Figure 7:
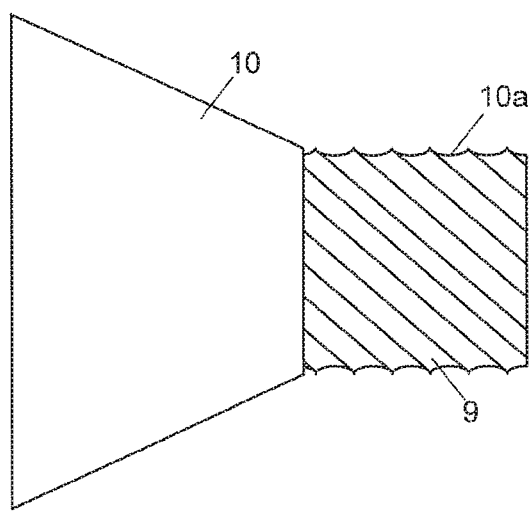
FIG. 7 is a side view showing a mandrel used for manufacturing the pressure-sensitive sensor in the second embodiment of the invention.

FIG. 6 is a cross sectional view showing a pressure-sensitive sensor in the second embodiment of the invention, and FIG. 7 is a side view showing a mandrel 10 used for manufacturing the pressure-sensitive sensor in the second embodiment of the invention. The mandrel 10 has plural (four in the second embodiment) holes (not shown) for passing the electrode wires 3 and it is thereby possible to feed the electrode wires 3 while keeping the positions of the electrode wires 3 on the vertices of a square. Additionally, a hole for injecting the compressed gas 53 may be provided.

In the second embodiment, the mandrel 10 can be used as a means for extruding the elastic insulation 51 while rotating in the circumferential direction. The mandrel 10 has a structure in which plural grooves 9 inclined with respect to the extruding direction (the axial direction of the tubular member 2) are engraved at equal intervals over the entire outer circumferential surface of a mandrel end portion 10a. Thus, the extrusion material (the elastic insulation 51) flows along the grooves 9 and is discharged obliquely with respect to the extruding direction. That is, it is possible to extrude a tubular extrudate while rotating in the circumferential direction, in the same manner as the first embodiment. As a result, the helical ribs 7 corresponding to the grooves 9 of the mandrel 10 are formed on the inner circumferential surface of the tubular extrudate (tubular member 2) as shown in FIG. 6. The helical direction of the helical ribs 7 formed on the inner circumferential surface of the tubular member 2 is the same as the helical direction of the helically-arranged electrode wires 3. In addition, the helical pitch of the helical ribs 7 is the same as the helical pitch of the electrode wires 3.

An inner circumferential shape of the tubular member 2 in the cross section varies depending on the shape of the grooves 9 of the mandrel 10. The cross-sectional shape of the groove 9 can be a semi-circular shape or a rectangular shape, but a semi-circular shape is suitable in view of easy flow of the extrusion material. For the groove 9, the number, depth and angle with respect to the extrusion direction can be freely selected. By changing the angle of the groove 9, the flow angle of the extrusion material (an angle formed between the axial direction of the tubular member 2 and the discharge direction of the extrusion material) can be changed and it is thereby possible to change a rotational speed of the extrusion material in the circumferential direction.

Figure 8:
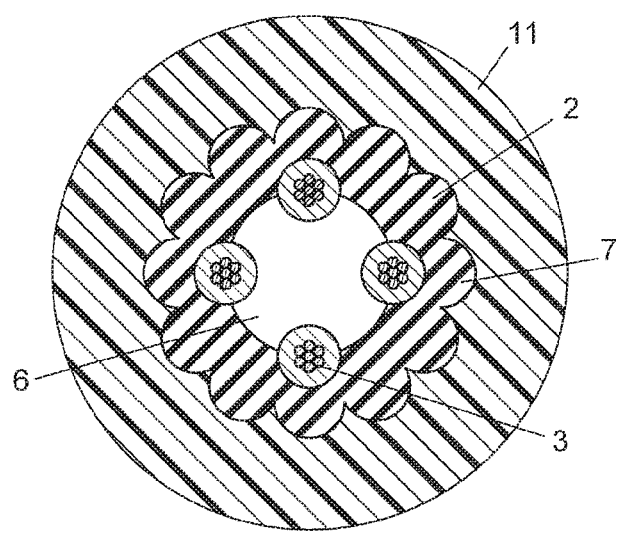
FIG. 8 is a cross sectional view showing a pressure-sensitive sensor in the third embodiment of the invention.

FIG. 8 is a cross sectional view showing a pressure-sensitive sensor in the third embodiment of the invention. An outer tubular member 11 is provided around the tubular member 2. Providing the outer tubular member 11 around the tubular member 2 is effective particularly to increase strength of the pressure-sensitive sensor or to enhance compatibility (adhesion, etc.) with other members (e.g., sealing members at end portions or a pressure-sensitive sensor attaching portion, etc.). Both the tubular member 2 and the outer tubular member 11 can be formed of an elastic insulation. To form the outer tubular member 11, it is possible to use, e.g., a thermoplastic urethane which is excellent in strength and abrasion resistance and has good adhesion to polyamide which is often used to form other members. As a manufacturing method, it is possible to employ a method in which the tubular member 2 is formed by the same method as that used in the method for manufacturing the pressure-sensitive sensor 1 in the first embodiment and the outer tubular member 11 is then extruded and applied as the outermost layer. Alternatively, it is possible to employ a method in which the tubular member 2 is formed by the same method as that used in the method for manufacturing the pressure-sensitive sensor 1 in the second embodiment and the outer tubular member 11 is then extruded and applied as the outermost layer.

As an alternative, the helical ribs 7 may be formed on the inner and outer circumferential surfaces of the tubular member 2 by, e.g., combining the die 8 used in the first embodiment with the mandrel 10 used in the second embodiment. In addition, the outer tubular member 11 may be further provided around the tubular member 2 having the helical ribs 7 on the inner and outer circumferential surfaces.

Although the die 8 and the mandrel 10 having the grooves 9 inclined with respect to the extruding direction (the axial direction of the tubular member 2) are used to form the helical ribs 7 on the inner circumferential surface and/or the outer circumferential surface of the tubular member 2, it is not limited thereto. For example, using a die or mandrel having grooves formed parallel to the extruding direction (the axial direction of the tubular member 2), the helical ribs 7 may be formed by continuously externally rotating the die or mandrel (a portion to discharge the extrusion material) in one direction.

Although the method for manufacturing the pressure-sensitive sensor having four electrode wires 3 has been described, the number of the electrode wires 3 can be two, three, or not less than five. In case of reducing the number of the electrode wires 3, it is preferable to reduce the helical pitch of the electrode wires 3 so that a predetermined sensor sensitivity is obtained. To reduce the helical pitch, an angle of the grooves 9 on the die 8 or the mandrel 10 with respect to the extruding direction (the axial direction of the tubular member 2) is increased. Since this increases a flow angle of the extrusion material (the elastic insulation 51) (an angle formed between the axial direction of the tubular member 2 and the discharge direction of the extrusion material), a rotation angle of the extrusion material in the circumferential direction is also increased, allowing the helical pitch of the electrode wires 3 to be reduced.

Technical ideas understood from the embodiments will be described below citing the reference numerals, etc., used for the embodiments. However, each reference numeral described below is not intended to limit the constituent elements in the claims to the members, etc., specifically described in the embodiments.

[1] A pressure-sensitive sensor (1), comprising: a hollow tubular member (2) comprising an elastic insulation; a plurality of electrode wires (3) spaced from one another and held on an inner circumferential surface of the tubular member (2), wherein the pressure-sensitive sensor (1) elastically deforms and causes at least any two of the plurality of electrode wires (3) to come into contact with each other when the tubular member (2) is subjected to an external pressure; and helical ribs (7) formed on at least one of inner and outer circumferential surfaces of the tubular member (2) along a longitudinal direction thereof, wherein the electrode wires (3) are helically arranged along the longitudinal direction, and wherein a helical direction of the helical ribs (7) of the tubular member (2) is a same as a helical direction of the helically-arranged electrode wires (3).

[2] A method for manufacturing a pressure-sensitive sensor (1) that comprises a hollow tubular member (2) comprising an elastic insulation, and a plurality of electrode wires (3) spaced from one another and held on an inner circumferential surface of the tubular member, and elastically deforms and causes at least any two of the plurality of electrode wires (3) to come into contact with each other when the tubular member (2) is subjected to an external pressure, the method comprising forming the tubular member (2) by extruding a tubular elastic insulation (51) such that the plurality of electrode wires (3) are held on the inner circumferential surface while feeding the plurality of electrode wires (3) at a distance from one another; and extruding the tubular elastic insulation (51) while rotating the tubular elastic insulation (51) in a circumferential direction of the tubular member (2) such that the plurality of electrode wires (3) are helically arranged along a longitudinal direction of the tubular member (2).

[3] The method for manufacturing a pressure-sensitive sensor (1) defined by [2], wherein the tubular elastic insulation (51) is made to flow along grooves (9) engraved on an inner circumferential surface of a die (8) so as to be inclined with respect to an extruding direction and is thereby extruded while being rotated in the circumferential direction.

[4] The method for manufacturing a pressure-sensitive sensor (1) defined by [2] or [3], wherein the tubular elastic insulation (51) is made to flow along grooves (9) engraved on an outer circumferential surface of a mandrel (10) so as to be inclined with respect to an extruding direction and is thereby extruded while being rotated in the circumferential direction.

Although the embodiments of the invention have been described, the invention according to claims is not to be limited to the embodiments. Further, please note that all combinations of the features described in the embodiments are not necessary to solve the problem of the invention. The invention can be appropriately modified and implemented without departing from the gist thereof.

What is claimed is:

1. A pressure-sensitive sensor, comprising:
   a hollow tubular member comprising an elastic insulation;
   a plurality of electrode wires spaced from one another and held on an inner circumferential surface of the tubular member; and
   helical ribs formed only on an outer circumferential surface of the tubular member along a longitudinal direction thereof,
   wherein the electrode wires are helically arranged along the longitudinal direction,
   wherein a helical direction of the helical ribs of the tubular member is a same as a helical direction of the helically-arranged electrode wires, and
   wherein a helical pitch of the helical ribs is the same as a helical pitch of the electrode wires.

2. A method for manufacturing the pressure-sensitive sensor of claim 1, the method comprising:
   forming the tubular member by extruding the tubular elastic insulation such that the plurality of electrode wires are held on the inner circumferential surface while feeding the plurality of electrode wires at a distance from one another; and
   extruding the tubular elastic insulation while rotating the tubular elastic insulation in a circumferential direction of the tubular member such that the plurality of electrode wires are helically arranged along the longitudinal direction of the tubular member.

3. The method according to claim 2, wherein the tubular elastic insulation is made to flow along grooves engraved on an inner circumferential surface of a die so as to be inclined with respect to an extruding direction and is thereby extruded while being rotated in the circumferential direction.

4. The method according to claim 2, wherein the tubular elastic insulation is made to flow along grooves engraved on an outer circumferential surface of a mandrel so as to be inclined with respect to an extruding direction and is thereby extruded while being rotated in the circumferential direction.

5. The method according to claim 3, wherein the tubular elastic insulation is made to flow along grooves engraved on an outer circumferential surface of a mandrel so as to be inclined with respect to an extruding direction and is thereby extruded while being rotated in the circumferential direction.

6. A pressure-sensitive sensor, comprising:
   a hollow tubular member comprising an elastic insulation;
   a plurality of electrode wires spaced from one another and held on an inner circumferential surface of the tubular member; and
   helical ribs formed on both an inner circumferential surface and an outer circumferential surface of the tubular member along a longitudinal direction thereof,
   wherein the electrode wires are helically arranged along the longitudinal direction, and wherein a helical direction of the helical ribs of the tubular member is a same as a helical direction of the helically-arranged electrode wires, and
   wherein a helical pitch of the helical ribs on the inner circumferential surface and a helical pitch of the helical ribs on the outer circumferential surface of the tubular member are the same as a helical pitch of the electrode wires.

7. A method for manufacturing the pressure-sensitive sensor of claim 6, the method comprising:
   forming the tubular member by extruding the tubular elastic insulation such that the plurality of electrode wires are held on the inner circumferential surface while feeding the plurality of electrode wires at a distance from one another; and extruding the tubular elastic insulation while rotating the tubular elastic insulation in a circumferential direction of the tubular member such that the plurality of electrode wires are helically arranged along the longitudinal direction of the tubular member.

8. The method according to claim 7, wherein the tubular elastic insulation is made to flow along grooves engraved on an inner circumferential surface of a die so as to be inclined with respect to an extruding direction and is thereby extruded while being rotated in the circumferential direction.

9. The method according to claim 7, wherein the tubular elastic insulation is made to flow along grooves engraved on an outer circumferential surface of a mandrel so as to be inclined with respect to an extruding direction and is thereby extruded while being rotated in the circumferential direction.

10. The method according to claim 8, wherein the tubular elastic insulation is made to flow along grooves engraved on an outer circumferential surface of a mandrel so as to be inclined with respect to an extruding direction and is thereby extruded while being rotated in the circumferential direction.

* * * * *